B. H. DOSENBACH.
PROCESS FOR CONCENTRATING ORES.
APPLICATION FILED MAR. 7, 1918.
1,268,940.
Patented June 11, 1918.
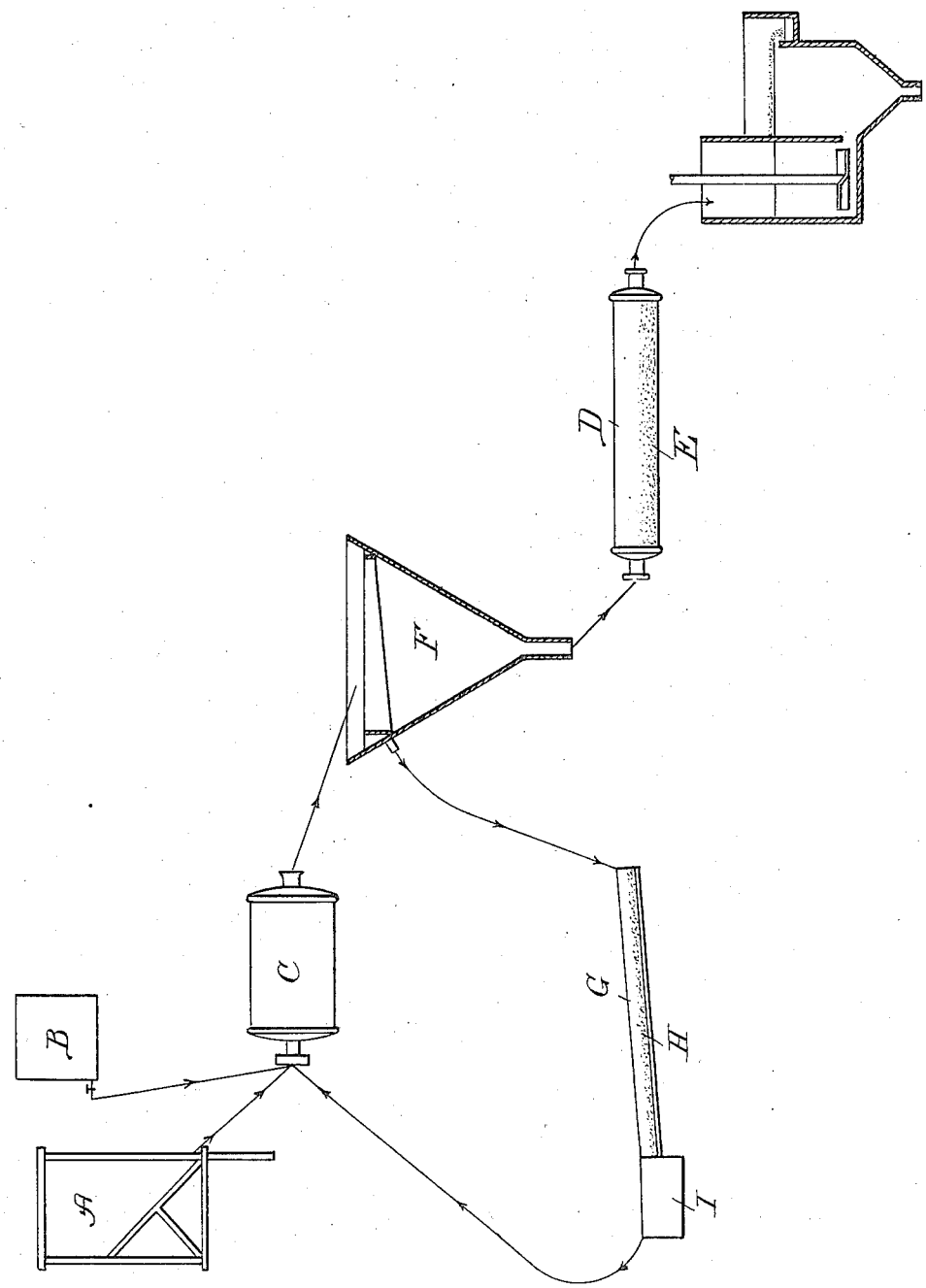
Witness:
John Enders.
Inventor:
Benjamin H. Dosenbach,
by Walter A. Scott
Atty.

UNITED STATES PATENT OFFICE.

BENJAMIN H. DOSENBACH, OF BUTTE, MONTANA.

PROCESS FOR CONCENTRATING ORES.

1,268,940.  Specification of Letters Patent.  Patented June 11, 1918.

Original application filed December 7, 1915, Serial No. 65,485. Divided and this application filed March 7, 1918. Serial No. 220,960.

*To all whom it may concern:*

Be it known that I, BENJAMIN H. DOSENBACH, a citizen of the United States, residing at Butte, in the county of Silver Bow and State of Montana, have invented certain new and useful Improvements in Processes for Concentrating Ores, of which the following is a specification.

This application is a division of my copending application Serial No. 65,485 for a process of concentrating ores, filed December 7, 1915.

My invention consists in means for concentrating ores by a combination of the leaching and flotation methods, and is particularly directed to the treatment of copper in which the copper exists in the form of sulfid, together with carbonates, oxids, and silicates, etc. Heretofore copper ores, in which the copper occurs in the form of a sulfid, having been concentrated by the flotation method, but ores in which the copper occurs in both the sulfid and forms other than a sulfid cannot be completely concentrated by flotation. It has also been found impossible to concentrate ores containing copper, as oxid, silicate or carbonate, by the ordinary water gravity appliances, such as jigs, tables and vanners, by reason of the fact that the carbonates, silicates and oxids of copper are of comparatively low specific gravity. Attempts have been made to concentrate ores containing copper, as oxid, silicate or carbonate, by leaching with sulfuric acid. Little success, however, has attended the treatment of copper ores by leaching. If the grinding be coarse, the copper enters into solution slowly. If the grinding be fine, the slimes thereby formed interfere with the subsequent steps in the operation. After the copper has been dissolved it becomes necessary to adopt some means for precipitating the copper and separating it from the sands and slimes. The most common methods heretofore applied for this purpose have been the electrolytic deposition of the copper, and the precipitation of the copper by the use of scrap iron. The existence of slimes in the liquor carrying the dissolved copper introduces difficulties in the application of both of these methods, and no method of leaching copper ores, heretofore devised, has been sufficiently efficient to be used to any considerable extent. Furthermore, the leaching process is not in any degree applicable to ores containing both sulfid and oxid copper, the term "oxid" being used to include carbonates, silicates and other compounds in which the oxid exists in combination with an acid radical; and it is for the concentration of such ores that my invention is intended. The insolubility of sulfid copper of course prevents any saving of that form of copper by leaching.

It is for the purpose of avoiding the difficulties in the methods above described that I have devised my improved process for concentrating copper ores in which the copper occurs as sulfid together with oxid, carbonate, silicate, etc. Briefly stated, my process consists, first, in grinding the ore as finely as may be necessary to effect the most rapid and complete solution of the copper, the existence of slimes in the ore pulp being no disadvantage in the application of the subsequent steps of the process. After the sulfuric acid, which is added to the pulp, has dissolved the copper I precipitate the copper, in metallic form, preferably by the use of iron scrap. Up to this point no separation of the copper from the remainder of the ore in the pulp has been effected. The copper in the oxid form has simply been dissolved, forming the sulfate, and then precipitated as metal, the process up to this point consisting simply in transforming the copper oxids, carbonates, silicates, etc., into metallic copper, while leaving the sulfid copper unaltered. Having effected this conversion of the oxid copper into free metal, I have found that the metallic copper and sulfid copper can both be separated by the ordinary flotation methods. At this point, therefore, I introduce air into the pulp, either by agitation or by passing the air through some porous medium, whereupon the sulfid copper and metallic copper float as a froth and are floated from the surface of the pulp in the methods ordinarily used in flotation operations. While the air introduced into the pulp by agitation, or by other means, is the principal instrumentality for separating and floating the copper, it may be that gases, such as hydrogen, carbon dioxid, and hydrocarbons are formed. The generation of hydrocarbon gases I have found to be quite noticeable, resulting probably from more or less complicated actions taking place between the sulfuric acid, the iron, the carbon and sulfur contained in the iron, the copper minerals contained in the ore, and interactions between the various products formed. Whatever the precise chemical reactions may be the generation of such hydrocarbon gases is frequently very noticeable.

The flotation of the metallic copper above referred to is in no way interfered with by the presence of fine slimes. This fact makes it possible to reduce the ore to any degree of fineness necessary without introducing any disadvantageous factor, by reason of the presence of the fine slimes so formed. It seems probable that the various salts formed during the leaching step of the process assist in the subsequent flotation of the metallic copper. In fact, in some instances, I have floated the copper in the form of a froth and have obtained a high grade of concentrate and a high recovery without adding any oil or other frothing agent, whatever, to the pulp, merely subjecting the pulp to agitation or aeration by other means after the copper has been dissolved and precipitated. In other instances I have found it advantageous to add some oil, or other frothing agent, such as turpentine, pyroligneous acid, etc., acetic acid, and alcohol. In some instances the formation of a froth is promoted by the addition of ferrous and aluminum sulfate.

A great many copper ores contain sulfid copper, together with the various oxids, carbonates, silicates, etc., of copper and my process is intended for the treatment of ores of this class. The sulfid copper in such ores remains practically unaltered during the leaching operation by which the oxids, carbonates and silicates of copper are dissolved, and after the dissolved copper is precipitated the application of the flotation step results in floating the sulfid copper, together with the precipitated metallic copper.

It will be obvious that many varieties of mechanism may be employed in the application of my process. As an example of a suitable arrangement of apparatus, I have illustrated in the drawing forming part of this application an arrangement similar to that used by me in the application of my process to the Butte ores above referred to. The drawing is diagrammatic, taking the form of what is generally termed a flow sheet. Detailed illustration and explanation of the apparatus used is unnecessary for the reason that all of the apparatus is of a type old and well-known in the art.

Referring to the drawing:

The ore suitably crushed, say to a maximum size of about one-fourth of an inch, is supplied to the apparatus from a bin A. The sulfuric acid used for leaching may be supplied from a tank B. The ore and sulfuric acid, together with sufficient water to make a pulp of proper consistency, are conducted to a tube mill C, where the ore is simultaneously subjected to as fine grinding as necessary, and to the solvent action of the sulfuric acid. Ordinarily the copper oxids, carbonates, and silicates will enter completely into solution in the pulp while in the tube mill referred to, but, of course, if a longer interval of time is necessary to effect the solution of the copper than is necessary for the grinding of the ore, the acid may be given further time for acting, by conducting the pulp from the tube mill to some suitable vessel for that purpose. Ordinarily, however, after the ore has been ground in the tube mill in the presence of the added sulfuric acid, the oxid copper will be completely dissolved and the pulp may then be conducted to a horizontal rotating cylinder D, which contains scrap iron, as indicated at E. I have shown an alternative method of treatment in which the pulp, instead of being conducted directly from the tube mill C, to the rotating cylinder D, is first conducted to a Dorr tank, or other settling device, for subsequent treatment. At present, however, I will describe the method of operation utilized when the pulp is conducted directly from the tube mill C to the rotating cylinder D. In this case the rotation of the cylinder D causes efficient contact between the scrap iron therein contained and the pulp which passes through the cylinder D from left to right, as shown in the drawing. The rotation of the cylinder D further has the effect of freeing the surface of the scrap iron from the precipitated copper, and by suitably timing the flow of pulp through the cylinder D, all of the dissolved copper may be precipitated therein. The precipitated copper, however, is not retained in the cylinder D, but, being precipitated in the pulp, is carried with the pulp and the product discharged from the cylinder D comprises everything that was originally in the ore, no separation having been effected up to this point. The material discharged from the cylinder D, however, carries the oxid copper in the form of precipitated or cement copper, as distinguished from the carbonates, silicates, and oxids, in which the copper originally existed. The object of the operation so far described is simply to effect the conversion of the copper into the metallic form. While the ore has been leached and the copper dissolved in the method employed in leaching processes, the operation is not a leaching process in the sense in which that term has been heretofore employed. The leaching forming part of my process does not, and is not intended to, effect directly any separation of the oxid copper from the remainder of the ore. The leaching is simply the first step in the conversion of the copper from the silicate, oxid, or carbonate form into the form of a free metal, which free metal results from the precipitation of cement copper by scrap iron in the rotating cylinder D.

The pulp discharged from the rotating cylinder D contains the oxid copper in the metallic form together with the unaltered sulfid copper, and in this form the copper originally present as oxid is amenable to flotation treatment, together with the unaltered sulfid copper, which treatment may be effected in any of the well-known forms of apparatus, such, for instance, as that illustrated in Patent No. 1,022,085, granted to James M. Hyde, April 2, 1912. As above stated, the flotation may be effected in apparatus in which the air is introduced into the pulp under sufficient pressure through a porous wall, or by means of jets. Such means of effecting flotation are illustrated in Patent No. 1,104,735, granted to J. M. Callow July 21, 1914. The flotation operation, however conducted, and whatever apparatus used, results in the flotation of the cement copper, together with the sulfid copper originally contained in the ore and it may be separated in the way ordinarily practised in flotation operations. As above stated, I have in some instances found the addition of a frothing agent, such as an oil, or other of the substances hereinbefore enumerated, unnecessary, but my process is not restricted to the use, or non-use, of any particular floating agent, and includes the operation regardless of whether the flotation be effected by the addition of frothing agents, or by the properties imparted to the pulp by the various salts formed in the leaching operation.

In the alternative method of procedure above referred to, the pulp, instead of being conducted directly from the tube mill C to the rotary cylinder D, may first be conducted to a Dorr tank, or other settling device F. The clear liquor from the settling device F is conducted to a scrap iron launder G, where the dissolved copper is precipitated by the scrap iron H, the precipitated, or cement copper being collected in the deep end I of the scrap iron launder, and the liquor being conducted back to the feed end of the tube mill C. By this means the acid contained in the clear liquor overflowing from the settling tank F, is saved, thus effecting some economy in the amount of acid used. When operating according to this method, the thickened material is draw off from the bottom of the settling tank F, and the copper dissolved therein is precipitated by scrap iron in the rotating cylinder D in the manner above described in connection with the first method of operation, after which the precipitated copper and sulfid copper are separated by flotation, as above stated, in connection with the first method of operation.

What I claim is:

1. A process of concentrating ores containing copper in different chemical compounds, one of such compounds being sulfid of copper, which consists in subjecting the ore to the action of a solvent which causes the non-sulfid copper to go into solution while leaving the sulfid copper substantially unaltered, precipitating the dissolved copper in the metallic state in the mixture of ore and solvent, and then separating the precipitated copper and sulfid copper from the gangue by flotation.

2. A process for concentrating ores containing sulfid copper and compounds of copper that are convertible into sulfates by the action of sulfuric acid comprising the operations of subjecting the ore to the action of sulfuric acid thus forming copper sulfate, precipitating the copper in the metallic state in the mixture of ore and acid, and then separating the precipitated copper and the sulfid copper from the gangue by flotation.

In testimony whereof, I have subscribed my name.

BENJAMIN H. DOSENBACH.